United States Patent
Glaser et al.

(10) Patent No.: US 8,434,721 B2
(45) Date of Patent: May 7, 2013

(54) AIRCRAFT TANK SYSTEM AND METHOD FOR REFUELING AN AIRCRAFT USING AN ERATION/DEAERATION DEVICE WITH A SHUT-OFF VALVE

(75) Inventors: Daniel Glaser, Mömbris (DE); Tim Kruse, Hamburg (DE); Heiko Lantermann, München (DE); Sebastian Pahner, Boizenburg/Elbe (DE); Peter Theis, Hamburg (DE); Oliver Thomaschewski, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 139 days.

(21) Appl. No.: 12/865,522

(22) PCT Filed: Feb. 2, 2009

(86) PCT No.: PCT/EP2009/000667
§ 371 (c)(1),
(2), (4) Date: Nov. 5, 2010

(87) PCT Pub. No.: WO2009/098012
PCT Pub. Date: Aug. 13, 2009

(65) Prior Publication Data
US 2011/0042520 A1 Feb. 24, 2011

Related U.S. Application Data

(60) Provisional application No. 61/026,863, filed on Feb. 7, 2008.

(30) Foreign Application Priority Data

Feb. 7, 2008 (DE) .................. 10 2008 007 932

(51) Int. Cl.
*B64D 37/14* (2006.01)

(52) U.S. Cl.
USPC ................ 244/135 A; 244/135 R; 141/59

(58) Field of Classification Search .............. 244/135 A, 244/135 R; 220/86.1, 86.2; 141/59, 290; 137/899.2, 255, 266; *B64D 37/14, 37/26*
See application file for complete search history.

(56) References Cited

U.S. PATENT DOCUMENTS 2,406,120 A   8/1946  Wirth
2,942,611 A * 6/1960  Klank, Jr. et al. ............... 137/43
(Continued)

FOREIGN PATENT DOCUMENTS

DE   1817129    7/1970
DE   19609939   9/1997
(Continued)

OTHER PUBLICATIONS

Kenneth Pedersen, International Search Report PCT/ISA/210, PCT/ISA/237, Aug. 10, 2009.

*Primary Examiner* — Joseph W Sanderson
*Assistant Examiner* — Timothy Schwarz
(74) *Attorney, Agent, or Firm* — Wood, Herron & Evans, LLP

(57) ABSTRACT

An aircraft tank system includes a tank cell for receiving fuel, a fuel line that connects the tank cell to a fuel inlet connection, and an aeration/deaeration device that for aeration/deaeration of the tank cell connects the tank cell to the environment. A shut-off valve of the aeration/deaeration device is adapted in an open position to open a connection between the tank cell and the environment and in a closed position to interrupt the connection between the tank cell and the environment. The aircraft tank system further includes an exhaust air outlet connection, which is connected to the aeration/deaeration device and which is adapted during filling of the tank cell with fuel to be connected to an aeration/deaeration connection of a storage tank of a refueling unit.

10 Claims, 2 Drawing Sheets

U.S. PATENT DOCUMENTS

| | | | |
|---|---|---|---|
| 2,965,196 | A | 12/1960 | Rich, Jr. |
| 4,032,091 | A * | 6/1977 | Reddy ................... 244/135 R |
| 5,575,441 | A | 11/1996 | Gervais et al. |
| 5,651,400 | A * | 7/1997 | Corts et al. ................... 141/59 |
| 5,782,258 | A | 7/1998 | Herbon et al. |
| 6,836,732 | B2 * | 12/2004 | Tiberi ........................ 702/24 |
| 7,823,610 | B2 * | 11/2010 | King ......................... 141/303 |
| 2002/0100505 | A1 * | 8/2002 | Keilty et al. ............ 137/487.5 |
| 2005/0173003 | A1 * | 8/2005 | Laverdiere et al. ....... 137/487.5 |
| 2008/0128557 | A1 * | 6/2008 | Acheson et al. .......... 244/135 R |

FOREIGN PATENT DOCUMENTS

| | | |
|---|---|---|
| GB | 468460 | 1/1935 |
| WO | 0066482 | 11/2000 |
| WO | 2007138366 | 12/2007 |

* cited by examiner

AIRCRAFT TANK SYSTEM AND METHOD FOR REFUELING AN AIRCRAFT USING AN ERATION/DEAERATION DEVICE WITH A SHUT-OFF VALVE

This application claims priority to International Application No. PCT/EP2009/000667, filed Feb. 2, 2009, under Section 371 and/or as a continuation under Section 120; which in turn claims priority to both U.S. Ser. No. 61/026,863, filed Feb. 7, 2008, and German Application No. 10 2008007932.4, filed Feb. 7, 2008.

TECHNICAL FIELD

The invention relates to an aircraft tank system, in particular an airplane aeroplane tank system, and to a refueling unit for refueling an aircraft tank system. The invention further relates to a method of refueling an aircraft.

BACKGROUND

A tank system of a commercial aircraft comprises a plurality of tank cells, which are conventionally disposed in the wings and in the middle wing box of the aircraft. Filling the tank system with fuel may be effected centrally by pressure refueling through a tank filler neck disposed in the region of a wing. Alternatively, refueling through a plurality of decentralized tank filler necks is also possible. During a refueling operation air displaced from the tank system is conveyed through ventilation lines to ventilation stubs provided in the region of the wing tips and is discharged from there into the environment. The air escaping from the tank system contains fuel vapour, wherein the fuel quantity that evaporates during the refueling operation depends upon the actual fuel saturation of the air, the temperature, the pressure and the nature of the fuel.

When refueling an aircraft with conventional kerosene, at an ambient temperature of 20° C. 11.9 ml/m$^3$ evaporates, substantially in the form of pentadecane. This means that, for example at Frankfurt airport where on peak days 18 million litres of kerosene are used to refuel aircraft, 214.1 litres of kerosene per day escape into the environment. The evaporation of fuel during aircraft refueling leads to a not inconsiderable loss of fuel that, given higher ambient temperatures and/or the use of more highly volatile alternative fuels, may even markedly exceed the values mentioned above. For example, it is reckoned that the use of ethanol fuel instead of kerosene would lead at Frankfurt airport to a fuel vapour emission of 790 t per year. Besides the economic loss, fuel vapour emission poses risks to safety and moreover has a negative impact on the environment. For these reasons, for some time now efforts have been directed towards preventing or at least minimizing the emission of fuel vapour during the refueling of aircraft.

U.S. Pat. No. 2,965,196 and U.S. Pat. No. 5,782,258 describe in each case an adsorption device that is connectable to a ventilation stub of a tank. The adsorption device contains an adsorbent material, such as for example fine-grained activated carbon, for adsorbing hydrocarbons that leave the tank during the refueling operation. These known systems have the drawback that the fuel attached to the adsorbent material is either impossible to recover or may be recovered only with a relatively high equipment outlay. The systems of prior art are therefore not suitable for use on board an aircraft.

The underlying object of the invention is to provide an aircraft tank system and a refueling unit for refueling an aircraft tank system that in a simple manner and while taking up a minimum of additional installation space prevent the emission of fuel vapour into the environment during a refueling operation and enable a recovery of the evaporated fuel. A further underlying object of the invention is to indicate a method of refueling an aircraft that is easy to carry out, prevents the emission of fuel vapour into the environment and enables a recovery of the fuel that has evaporated during the refueling operation.

SUMMARY OF THE INVENTION

This object is achieved by an aircraft tank system having the features described below, a refueling unit for refueling an aircraft tank system having the features described below, and a method of refueling an aircraft having the features described below.

An aircraft tank system according to the invention comprises at least one tank cell for receiving fuel. The tank cell is adapted to be filled with kerosene or any other fuel for operating the aircraft. It is self-evident that the aircraft tank system according to the invention may also comprise a plurality of tank cells which, in the installed state of the tank system on board an aircraft, are disposed for example in the wings and/or in the middle wing box of the aircraft. A fuel line connects the tank cell to a fuel inlet connection. Through the fuel inlet connection and the fuel line fuel may be supplied to the tank cell. Given a tank system comprising a plurality of tank cells, the fuel line is preferably fashioned in such a way that it connects all of the tank cells to a central fuel inlet connection. It is of course alternatively possible for a plurality of fuel lines and/or a plurality of fuel inlet connections to be provided. The aircraft tank system according to the invention further comprises an aeration/deaeration device, for example in the form of an aeration/deaeration line, which for aerating/deaerating the tank cell connects the tank cell to the environment. For example, the aeration/deaeration device connects the tank cell via at least one NACA (National Advisory Committee of Aeronautics) inlet to the environment. The NACA inlet may be disposed for example in the region of a wing tip of the aircraft. Preferably the aircraft tank system according to the invention is provided with two NACA inlets that are disposed in each case at the wing tips of the two wings of the aircraft.

The aeration/deaeration device of the aircraft tank system according to the invention comprises a shut-off valve that is adapted in an open position to open a connection between the tank cell and the environment and in a closed position to close the connection between the tank cell and the environment. The shut-off valve is preferably disposed in the region of the NACA inlet and adapted in its closed position to prevent air from flowing out of the aeration/deaeration device through the NACA inlet and prevent air from flowing into the aeration/deaeration device through the NACA inlet. If the aircraft tank system according to the invention comprises a plurality of aeration/deaeration devices and/or a plurality of NACA inlets for connecting the aeration/deaeration device(s) to the environment, the aircraft tank system is also equipped with a corresponding number of shut-off valves, which make it possible for the aeration/deaeration device(s) to be completely shut off from the environment. Finally, the aircraft tank system according to the invention comprises an exhaust air outlet connection, which is connected to the aeration/deaeration device and which during filling of the tank cell with fuel is connectable to an aeration/deaeration connection of a storage tank of a refueling unit, i.e. is adapted during filling of the tank cell with fuel to be connected to an aeration/deaeration connection of a storage tank of a refueling unit.

A refueling unit according to the invention for refueling an aircraft tank system as described above comprises a storage tank for receiving fuel that has a fuel outlet connection as well as an aeration/deaeration connection. A refueling line of the refueling unit is connectable to the fuel outlet connection of the storage tank and to a fuel inlet connection of the aircraft tank system in order to convey fuel from the storage tank into the tank cell of the aircraft tank system. An exhaust air line of the refueling unit is connectable to the aeration/deaeration connection of the storage tank and to the exhaust air outlet connection of the aircraft tank system in order during filling of the tank cell of the aircraft tank system with fuel to convey exhaust air from the tank cell of the aircraft tank system into the storage tank of the refueling unit. The refueling unit according to the invention may take the form of a mobile unit, for example the form of a fuelling vehicle. However, the refueling unit may alternatively be a stationary unit.

When an aircraft equipped with the aircraft tank system according to the invention is refueled by means of a refueling unit according to the invention, the fuel inlet connection of the tank system is connected by the refueling line of the refueling unit to the fuel outlet connection of the storage tank of the refueling unit. Through the refueling line fuel is conveyed from the storage tank into the tank cell of the aircraft tank system. Filling of the tank cell of the aircraft tank system with fuel from the storage tank of the refueling unit is effected preferably by pressure refueling. The exhaust air outlet connection of the aircraft tank system that is connected to the aeration/deaeration device is connected by the exhaust air line of the refueling unit to the aeration/deaeration connection of the storage tank of the refueling unit. When the exhaust air outlet connection of the aircraft tank system is connected to the aeration/deaeration connection of the storage tank, during filling of the tank cell of the aircraft tank system with fuel exhaust air is conveyed from the tank cell of the aircraft tank system into the storage tank.

The emission of exhaust air from the tank cell of the tank system into the environment is prevented in that the shut-off valve of the aeration/deaeration device is controlled into its closed position. If the aircraft tank system comprises a plurality of shut-off valves, all of the shut-off valves are controlled into their closed position. As the discharge of waste air from the tank cell of the aircraft tank system into the environment is prevented, the total air volume that is displaced by a corresponding fuel volume from the tank cell of the tank system is transferred into the storage tank of the refueling unit. As the fuel in the case of pressure refueling is supplied to the tank cell of the tank system in any case at a pressure higher than the ambient pressure, no additional feed device is needed to remove the exhaust air from the tank cell. An aeration/deaeration device, in the form of an aeration/deaeration line, of the aircraft tank system according to the invention is however preferably configured as a pressure line.

The present invention makes it possible reliably to prevent the emission of exhaust air containing fuel vapour from the tank system of the aircraft into the environment during refueling of an aircraft. The aircraft tank system according to the invention, the refueling unit according to the invention and the method according to the invention of refueling an aircraft are therefore particularly eco-friendly. The present invention moreover makes it possible to minimize safety risks resulting from the emission of exhaust air containing fuel vapour. Finally, the fuel that evaporates during refueling of the aircraft may condense in the storage tank of the refueling unit, given the presence of suitable ambient conditions (pressure, temperature), and hence be recovered. Given a closed supply chain between a fuel depot at the airport, a fuelling vehicle and the aircraft tank system, a recovery through condensation is not necessary as the air in the system is saturated and remains in the system. Fuel recovery is also economically of interest in particular for highly volatile fuels. The present invention is therefore usable in a particularly advantageous manner for the refueling of an aircraft with alternative fuels, such as for example alcohols or bio-fuels.

A further advantage of the present invention is that it may be realized without a high outlay. The aircraft tank system according to the invention is notable for a very low additional weight as well as a very low additional installation space requirement. For example, in the case of refueling unit according to the invention the in any case provided aeration/deaeration connection of the refueling unit may be used to connect the exhaust air line to the storage tank of the refueling unit.

Finally, the aircraft tank system according to the invention, if need be, is operational also without feeding exhaust air into a storage tank of a refueling unit. An aircraft equipped with the aircraft tank system according to the invention may therefore also be refueled conventionally, i.e. with discharging of the waste air from the tank cell of the tank system into the environment. The aircraft is then not subject to any restrictions at all if for example at an airport there is no refueling unit capable of interacting with the tank system according to the invention. Furthermore, the tank system need not necessarily be of a fail-safe design.

The aircraft tank system according to the invention preferably comprises a control device for controlling the shut-off valve of the aeration/deaeration device of the tank system. If the tank system comprises a plurality of shut-off valves, the control device preferably controls all of the shut-off valves of the tank system. However, each shut-off valve of the aircraft tank system may alternatively be controlled by means of a separate control device. The control device configured for example in the form of an electronic control device controls the shut-off valve preferably on the basis of sensor signals that indicate whether the exhaust air outlet connection connected to the aeration/deaeration device of the aircraft tank system is connected to the aeration/deaeration connection of the storage tank of the refueling unit. The control device controls the shut-off valve into a closed position only if the sensor signals indicate to the control device that there is a proper connection of the exhaust air outlet connection of the tank system to the aeration/deaeration connection of the storage tank of the refueling unit. An unintentional shut-off of the aeration/deaeration device of the tank system, which might lead to inadequate aeration/deaeration of the tank cell of the system, is therefore reliably prevented.

The shut-off valve of the aeration/deaeration device of the aircraft tank system according to the invention is preferably configured as a pressure/vacuum relief valve. For example, the shut-off valve may be configured as a safety valve with pressure/vacuum relief. Alternatively, a configuration comprising for example three valves connected in parallel, i.e. a switchable shut-off valve, a pressure relief valve and a pressure relief valve, is also conceivable. Given such a configuration, it would be sufficient to control only the switchable shut-off valve by means of the electronic control device. A shut-off valve with pressure/vacuum relief enables a safe refueling operation even in the event of extreme temperature differences between the tank cell of the aircraft tank system and the storage tank of the refueling unit.

The exhaust air outlet connection connected to the aeration/deaeration device of the aircraft tank system according to the invention is preferably disposed adjacent to the fuel inlet connection of the aircraft tank system or is designed to be integrated with the fuel inlet connection of the aircraft tank system. In a similar fashion, the aeration/deaeration connection of the storage tank of the refueling unit according to the invention is preferably disposed adjacent to the fuel outlet connection of the storage tank or is designed to be integrated with the fuel outlet connection of the storage tank. Given such an arrangement, the refueling line and the exhaust air line of the refueling unit according to the invention may be connected in a particularly simple and rapid manner to the corresponding connections of the refueling unit and the aircraft tank system.

The refueling of an aircraft equipped with the aircraft tank system according to the invention by means of a refueling unit according to the invention is particularly convenient if the exhaust air outlet connection, which is connected to the aeration/deaeration device of the aircraft tank system, and the fuel inlet connection of the aircraft tank system are configured in the form of a coaxial coupling. The exhaust air outlet connection and the fuel inlet connection may then be connected to a coaxial line forming the fuel line and the exhaust air line of the refueling unit. In order to guarantee a proper connection of this coaxial line to the aeration/deaeration connection and to the fuel outlet connection of the storage tank of the refueling unit, the aeration/deaeration connection and the fuel outlet connection of the storage tank are then preferably configured likewise in the form of a coaxial coupling.

BRIEF DESCRIPTION OF THE DRAWING DRAWINGS

There now follows a detailed description of a preferred embodiment of the present invention with reference to the accompanying diagrammatic figures.

DETAILED DESCRIPTION

Figure 1:
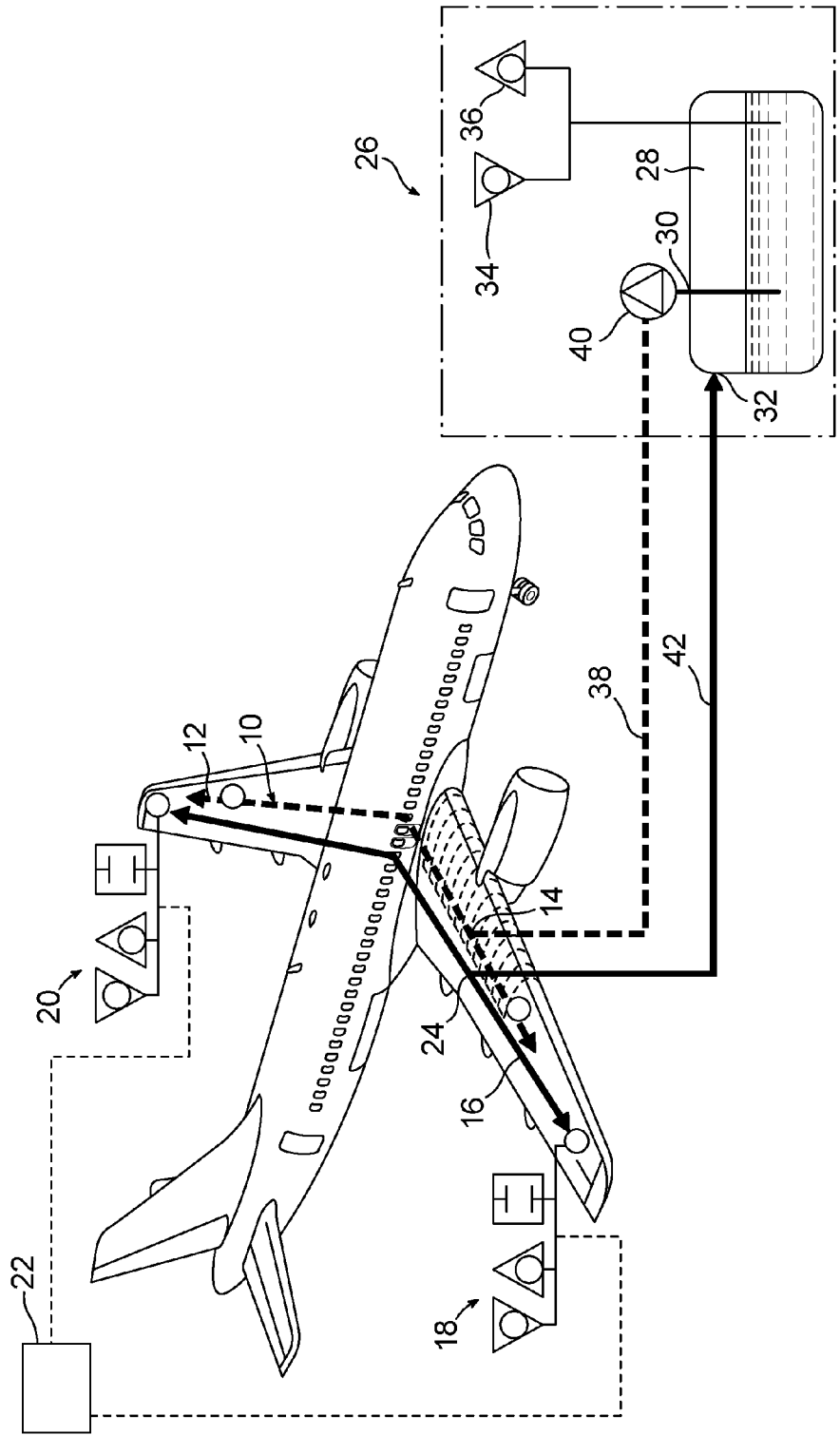
FIG. 1 shows an aircraft having an aircraft tank system as well as a refueling unit for refueling the aircraft tank system.
Figure 2:
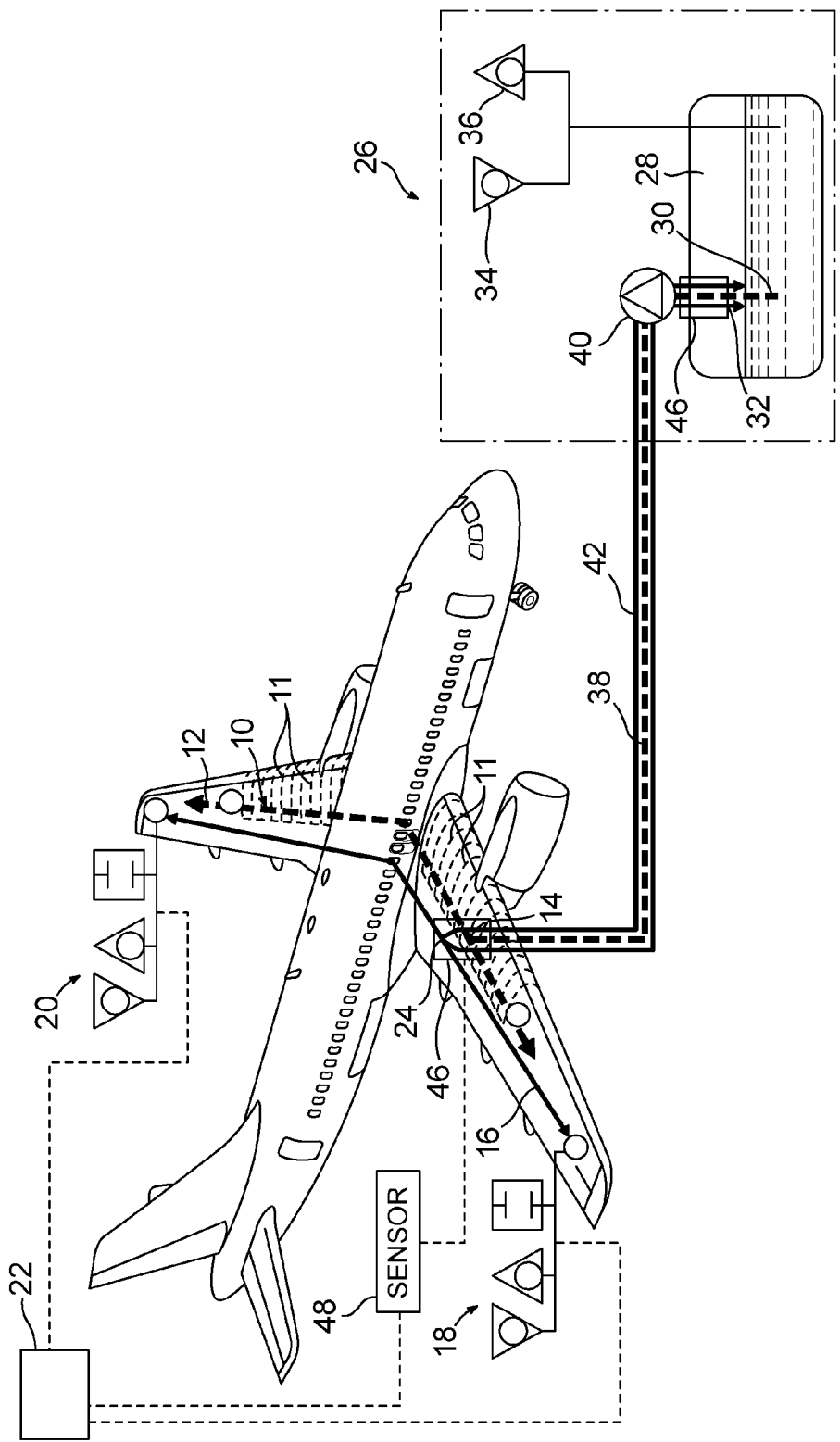
FIG. 2 shows another aircraft having an aircraft tank system as well as a refueling unit, with the use of coaxial couplings.

An aircraft shown in the figures is equipped with an aircraft tank system 10 that comprises a plurality of tank cells 11 (a few of which are shown schematically in FIG. 2). The tank cells 11 are disposed in the region of the wings and a middle wing box of the aircraft. A fuel line 12 connects the tank cells 11 of the aircraft tank system 10 to a central fuel inlet connection 14 disposed in the region of the starboard wing of the aircraft. During normal operation of the aircraft the fuel inlet connection 14 is closed. It is only during refueling of the aircraft that the fuel inlet connection 14 is opened to allow fuel to be fed into the fuel line 12 and consequently into the tank cells 11 of the tank system 10.

In order during normal operation of the aircraft to guarantee a proper aeration/deaeration of the tank cells of the aircraft tank system 10, the tank cells of the tank system 10 are connected to an aeration/deaeration line 16. The aeration/deaeration line 16 extends, in a similar manner to the fuel line 12, along the wings of the aircraft. Provided at each of the wing tips is an NACA inlet that connects the aeration/deaeration line 16 to the environment. In the region of each NACA inlet a shut-off valve 18, 20 is disposed in the aeration/deaeration line 16.

The shut-off valves 18, 20 are configured in each case as pressure- and vacuum relief valves and in an open position open the NACA inlets of the aeration/deaeration line 16. In a closed position, on the other hand, the shut-off valves 18, 20 block the NACA inlets of the aeration/deaeration line 16. When the shut-off valves 18, 20 are in their closed position, ambient air may therefore flow through the aeration/deaeration line 16 into the tank cells of the tank system 10. In an identical manner, a flow of air from the tank cells of the tank system 10 through the aeration/deaeration line 16 into the environment is possible. The shut-off valves 18, 20 are controlled by means of an electronic control device 22.

The aircraft tank system 10 further comprises an exhaust air outlet connection 24, which is connected to the aeration/deaeration line 16. In a similar manner to the fuel inlet connection 14, the exhaust air outlet connection 24 is also designed to be closable and is opened only upon refueling of the aircraft. In the open state of the exhaust air outlet connection 24, air may be removed by means of the aeration/deaeration line 16 from the tank cells of the tank system 10 through the exhaust air outlet connection 24.

A refueling unit 26 for refueling the aircraft tank system 10 comprises a tank 28 for receiving fuel. The storage tank 28 has a fuel outlet connection 30 as well as an aeration/deaeration connection 32. Safety valves 34, 36 protect the storage tank 28 against undesirably high or low pressure.

The refueling unit 26 is configured either as a mobile unit in the form of a fueling vehicle or in the form of a stationary system, and it further comprises a refueling line 38. In order to convey fuel from the storage tank 28 into the tank cells of the aircraft tank system 10, the refueling line 38 is connectable to the fuel outlet connection 30 of the storage tank 28 and to the fuel inlet connection 14 of the aircraft tank system 10. A delivery device 40 delivers the fuel under pressure through the refueling line 38.

Finally, the refueling unit 26 comprises an exhaust air line 42. The exhaust air line 42 is connectable to the aeration/deaeration connection 32 of the storage tank 28 and to the exhaust air outlet connection 24 of the aircraft tank system 10. As described above, the refueling line 38 and the exhaust air line 42 may be configured to couple to the corresponding fuel outlet connection 30 and the aeration/deaeration connection 32 of the storage tank 28 with a coaxial coupling 46, which is shown schematically in FIG. 2.

To refuel the aircraft, first the fuel outlet connection 30 of the storage tank 28 is connected by the refueling line 38 to the fuel inlet connection 14 of the aircraft tank system 10. Then, the aeration/deaeration connection 32 of the storage tank 28 is connected by the exhaust air line 42 to the exhaust air outlet connection 24 of the aircraft tank system 10. As the aeration/deaeration connection 32 and the fuel outlet connection 30 of the storage tank 28, as well as the exhaust air outlet connection 24 and the fuel inlet connection 14 of the tank system 10, are disposed adjacent to one another, the exhaust air line 42 and the refueling line 38 of the refueling unit 26 are connectable in a relatively rapid and simple manner to the corresponding connections of the aircraft tank system 10 and the storage tank 28. As described above, the refueling line 38 and the exhaust air line 42 may be configured to couple to the corresponding fuel inlet connection 14 and the exhaust air outlet connection 24 of the aircraft tank system 10 with a coaxial coupling 46, which is shown schematically in FIG. 2.

If the exhaust air line 32 of the refueling unit 26 is connected properly to the exhaust air outlet connection 24 of the aircraft tank system 10, a sensor, shown schematically as element 48 in FIG. 2, outputs a corresponding signal to the electronic control device 22. The electronic control device 22 then controls the shut-off valves 18, 20 into their closed position. The connection between the tank cells 11 of the tank system 10 and the environment is therefore interrupted. The discharge of exhaust air from the tank cells 11 of the tank system 10 is therefore no longer possible.

During the pressure refueling of the tank cells of the tank system 10, an air volume that corresponds to the fuel volume fed from the storage tank 28 into the tank cells is displaced from the tank cells of the tank system 10. The air displaced from the tank cells is conveyed through the aeration/deaeration line 16, configured as a pressure line, of the tank system 10 to the exhaust air outlet connection 24 connected to the aeration/deaeration line 16 and is removed from there through the exhaust air line 42 into the storage tank 28 of the refueling unit 26. With the exhaust air, fuel vapour contained in the exhaust air is also carried away into the storage tank 28 of the refueling unit 26 and may be recovered there under suitable ambient conditions by condensation.

At the end of refueling operation the refueling line 38 and the exhaust air line 42 of the refueling unit 26 are detached from the corresponding connections of the aircraft tank system 10. The electronic control device 22 then receives signals indicating that the exhaust air outlet connection 24 of the aircraft tank system 10 is no longer connected by the exhaust air line 42 to the aeration/deaeration connection 32 of the storage tank 28. The electronic control device 22 subsequently controls the shut-off valves 18, 20 back into their open position, in which they connect the tank cells of the tank system 10 by the aeration/deaeration line 16 to the environment.

In principle, the shut-off valves 18, 20 may remain in their open position also during the refueling operation. The exhaust air containing fuel vapour that is displaced from the tank cells during filling of the tank cells of the aircraft tank system 10 is then discharged in a conventional manner through the aeration/deaeration line 16 and the NACA inlets into the environment. The aircraft tank system 10 is consequently operational even if a refueling unit, which allows the exhaust air displaced from the tank cells of the tank system 10 to be removed through the exhaust air outlet connection 24 of the aircraft tank system 10, is not available.

Furthermore, because the shut-off valves 18, 20 are configured in each case as pressure/vacuum relief valves, even in the event of failure of the exhaust air outlet connection 24, the exhaust air line 42 or the aeration/deaeration connection 32 of the storage tank 28 a proper ventilation of the tank cells of the aircraft tank system 10 during a refueling operation is guaranteed. The shut-off valves 18, 20 configured as safety valves moreover prevent an undesirably low pressure from building up in the aeration/deaeration line 16 or the tank cells of the tank system 10.

The invention claimed is:

1. An aircraft tank system comprising:
 a plurality of tank cells for receiving fuel,
 a fuel line connecting the plurality of tank cells to a fuel inlet connection,
 a shut-off valve,
 an aeration/deaeration line connecting the plurality of tank cells to the shut-off valve, which leads to an environment outside the tank cells, wherein the shut-off valve is adapted in an open position to connect the plurality of tank cells to the environment and adapted in a closed position to isolate the plurality of tank cells from the environment, and
 a control device that is adapted during filling of the tank cells with fuel to maintain the shut-off valve in the closed position,
 wherein there is connected to the aeration/deaeration line an exhaust air outlet connection, which during filling of the plurality of tank cells with fuel is connectable to an aeration/deaeration connection of a storage tank of a refueling unit in order during filling of the plurality of tank cells to convey exhaust air from the tank cells into the storage tank of the refueling unit, wherein the shut-off valve is maintained in the closed position as long as the exhaust air outlet connection is connected to the aeration/deaeration connection.

2. The aircraft tank system according to claim 1, further comprising:
 a sensor that generates sensor signals that indicate whether the exhaust air outlet connection connected to the aeration/deaeration line of the aircraft tank system is connected to the aeration/deaeration connection of the storage tank of the refueling unit, wherein the control device is adapted to control the shut-off valve on the basis of the sensor signals.

3. The aircraft tank system according to claim 1, wherein the shut-off valve is configured as a pressure/vacuum relief valve.

4. The aircraft tank system according to claim 1, wherein the exhaust air outlet connection connected to the aeration/deaeration line of the aircraft tank system is disposed adjacent to the fuel inlet connection of the aircraft tank system or is formed integral with the fuel inlet connection of the aircraft tank system.

5. The aircraft tank system according to claim 4, wherein the exhaust air outlet connection, which is connected to the aeration/deaeration line of the aircraft tank system, and the fuel inlet connection of the aircraft tank system are configured in the form of a coaxial coupling.

6. The aircraft tank system according to claim 5, wherein the exhaust air outlet connection, which is connected to the aeration/deaeration line of the aircraft tank system, and the fuel inlet connection of the aircraft tank system are configured in the form of a coaxial line.

7. A method of refueling an aircraft, comprising:
 connecting a fuel outlet connection of a storage tank of a refueling unit to a fuel inlet connection of an aircraft tank system,
 conveying fuel from the storage tank into a tank cell of the aircraft tank system,
 controlling a shut-off valve connected to an aeration/deaeration line of the aircraft tank system, which is adapted in an open position to connect the tank cell and the environment and adapted in a closed position to isolate the tank cell from the environment, into the closed position, wherein an aeration/deaeration connection of the storage tank of the refueling unit is connected to an exhaust air outlet connection connected to the aeration/deaeration line of the aircraft tank system so that during filling of the tank cell of the aircraft tank system with fuel, exhaust air is conveyed out of the tank cell of the aircraft tank system into the storage tank of the refueling unit, and
 maintaining the shut-off valve in the closed position as long as the exhaust air outlet connection is connected to the aeration/deaeration connection.

8. The method according to claim 7, further comprising:
 sensing with a sensor whether the exhaust air outlet connection connected to the aeration/deaeration line of the aircraft tank system is connected to the aeration/deaeration connection of the storage tank of the refueling unit to generate corresponding sensor signals,
 wherein the shut-off valve is controlled by a control device on the basis of the sensor signals.

9. A method of refueling an aircraft, comprising:
connecting a fuel outlet connection of a storage tank of a refueling unit to a fuel inlet connection of an aircraft tank system,
connecting an exhaust air outlet connection of an aeration/deaeration line of the aircraft tank system to an aeration/deaeration connection of the storage tank of the refueling unit,
controlling a shut-off valve connected to the aeration/deaeration line to be in a closed position when the exhaust air outlet connection is connected to the aeration/deaeration connection and as long as the exhaust air outlet connection is connected to the aeration/deaeration connection, thereby preventing air flow between the tank cell and the environment,
conveying fuel from the storage tank into a tank cell of the aircraft tank system,
disconnecting the fuel outlet connection from the fuel inlet connection and the exhaust air outlet connection from the aeration/deaeration connection after conveyance of fuel from the storage tank to the tank cell to refill the tank cell, and
controlling the shut-off valve to be in an open position when the exhaust air outlet connection is disconnected from the aeration/deaeration connection, thereby enabling air flow between the tank cell and the environment,
wherein during filling of the tank cell of the aircraft tank system with fuel, exhaust air is conveyed out of the tank cell of the aircraft tank system into the storage tank of the refueling unit.

10. The method according to claim 9, further comprising:
sensing with a sensor whether the exhaust air outlet connection is connected to the aeration/deaeration connection to generate corresponding sensor signals,
wherein the shut-off valve is controlled to be in the closed position and in the open position on the basis of the sensor signals.

* * * * *